2,954,314
FUNGICIDES

Horst Metzger, Ludwigshafen (Rhine), and Oskar Flieg, Limburgerhof, Pfalz, Germany, assignors to Badische Anilin- & Soda Fabrik Aktiengesellschaft, Ludwigshafen (Rhine), Germany No Drawing. Filed Aug. 20, 1957, Ser. No. 679,150

Claims priority, application Germany Aug. 25, 1956

6 Claims. (Cl. 167—22)

This invention relates to a new fungicidal agent.

It is already known that salts of N-aryl-N-nitrosohydroxylamines have fungicidal action.

We have found that N-nitroso-hydroxylamines and their salts of the general formula

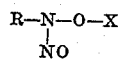

in which R represents an aliphatic, araliphatic or cycloaliphatic radical and X hydrogen, a metal or an ammonium radical, are excellent fungicides which are superior to the corresponding aryl-substituted compounds as regards their effect and stability. As compared with the compounds of the aromatic series known from the U.S. patent specification No. 2,635,978, the fungicides according to the present invention are also characterized by smaller toxicity.

Highly active aliphatic and cycloaliphatic substituents R are for example methyl, isopropyl, benzyl, butyl, cyclohexyl, hydroxmethyl-cyclohexyl, cyano-cyclohexyl-, cycloheptyl and cyclo-octyl radicals. As the substituent X there are suitable, besides hydrogen and ammonium, for example alkyl-ammonium or cycloalkyl-ammonium, the monovalent or polyvalent metals of the 1st to 4th main groups and the 1st to 8th sub-groups of the periodic system, as for example sodium, potassium, calcium, barium, aluminum, lead, silver, copper, zinc, mercury, cerium, iron, nickel and also alkyl-mercury, alkoxyalkyl-mercury, aryl-mercury and halogen-mercury.

The N-alkyl- and N-cycloalkyl-N-nitroso-hydroxylamines are suitable according to this invention for the protection of substrates endangered by injurious fungi, such as cultivated plants, fruit, paper, textiles, glue, tanning liquors, leather, wood, mechanical wood pulp, synthetic substances or emulsions of synthetic substances, lacquers and the like. Depending on their solubility and purpose of use they may be used in known manner in aqueous solution or dispersion, dissolved in oil or as an oily solution emulsified in water, or in the form of preparations, capable of being scattered or dusted, in admixture with inert materials, such as talc, clay or shale meal. Wetting agents, as for example alkyl or aryl sulfonates, and adhesives based on resins, wood ethers, waxes, or the like, may also be incorporated in the preparations.

The fungicidal activity of the compounds is illustrated in the following examples, but the invention is not limited to these examples.

EXAMPLE 1

Finely ground mixtures of talc with increasing amounts of active substance of the compositions specified in the table are dusted with the addition of spores of the mould fungus onto nutrient agar *Aspergillus niger*, 17 mg. of each mixture of active substance, talc and spores being used for each square centimetre. The growth of the fungus was determined after incubation for 5 days at 35° C. In Table 1, +++ indicates full fungus growth; dense, closed mycelium cover, ++ indicates slightly inhibited fungus growth; thin or loose mycelium cover, + indicates strongly inhibited fungus growth: only isolated small mycelium islands, and − indicates total inhibition of the fungus growth.

*Table 1.—Growth of Aspergillus niger*

| When using R—N—O—X, NO in which— | | Percentage content of active substance in the mixture of active substance and talc | | | | | | |
|---|---|---|---|---|---|---|---|---|
| R= | X= | 0.075 | 0.15 | 0.31 | 0.63 | 1.25 | 2.5 | 5 |
| isopropyl | cyclohexyl-ammonium | +++ | +++ | +++ | ++ | − | − | − |
| Do | copper | +++ | +++ | − | − | − | − | − |
| cyclohexyl | hydrogen | +++ | +++ | − | − | − | − | − |
| Do | sodium | +++ | +++ | − | − | − | − | − |
| Do | potassium | +++ | +++ | − | − | − | − | − |
| Do | ammonium | +++ | +++ | − | − | − | − | − |
| Do | calcium | +++ | +++ | ++ | − | − | − | − |
| Do | copper (II) | +++ | +++ | + | − | − | − | − |
| Do | mercury chloride (HgCl) | +++ | +++ | +++ | − | − | − | − |
| Do | zinc | +++ | +++ | +++ | − | − | − | − |
| Do | lead (II) | +++ | +++ | − | − | − | − | − |
| Do | cyclohexyl-ammonium | +++ | +++ | − | − | − | − | − |
| Do | cerium (III) | ++ | ++ | ++ | − | − | − | − |
| Do | barium | ++ | ++ | ++ | − | − | − | − |
| cycloheptyl | ammonium | +++ | +++ | − | − | − | − | − |
| Do | copper (II) | +++ | +++ | ++ | + | − | − | − |
| cyclo-octyl | ammonium | +++ | +++ | +++ | +++ | − | − | − |
| Do | copper (II) | +++ | +++ | ++ | − | − | − | − |
| Do | zinc | +++ | +++ | − | − | − | − | − |
| benzyl | ammonium | +++ | +++ | ++ | − | − | − | − |
| Do | copper (II) | +++ | +++ | ++ | + | + | − | − |
| methyl | copper (II) | +++ | + | ++ | + | + | − | − |
| 1-hydroxy-methyl-cyclohexyl | copper (II) | +++ | +++ | +++ | ++ | − | − | − |
| For comparison | | | | | | | | |
| phenyl | ammonium | +++ | +++ | ++ | + | − | − | − |
| Do | copper (II) | +++ | +++ | +++ | ++ | + | − | − |
| Do | zinc | +++ | +++ | +++ | + | + | − | − |

Control without active substance +++.

EXAMPLE 2

Leaves of grape vines in pots are sprayed with aqueous dispersions of a finely ground mixture of 80 parts by weight of the copper salt of N-cyclohexyl-N-nitrosohydroxylamine and N-isopropyl-N-nitrosohydroxylamine and 20 parts by weight of sodium lignin sulfonate. For comparison the corresponding mixture of the copper salt of N-phenyl-n-nitrosohydroxylamine is used. After the sprayed coating has dried, the underside of the leaves is infected by spraying on a spore suspension of grape vine fungus (*Plasmopara viticola*). To intensify the infection conditions, the plants were then kept for 12 hours in a chamber saturated with water vapor at 20° C. After remaining for 8 days in the greenhouse at temperatures varying between 20° and 30° C. the plants are again placed in the said moist chamber for 12 hours to intensify the outbreak of spores. Counting the spore positions on the undersides of the leaves gave the following results.

| at a concentration of the spraying solution of | Percent of attacked leaves after treatment with the copper salt of— | | |
|---|---|---|---|
| | N-cyclohexyl-N-nitrosohydroxylamine | N-isopropyl-N-nitrosohydroxylamine | N-phenyl-N-nitrosohydroxylamine |
| 0.125% | 0.0 | 0.0 | 4.3 |
| 0.063% | 1.0 | 0.0 | 24.0 |
| 0.031% | 7.3 | 0.0 | 25.0 |
| 0.016% | 13.4 | 16.4 | 46.1 |

Control 54.7.

EXAMPLE 3

30 grams of finely grated orange peel are extracted for 2 hours with 120 grams of water. The filtrate is made up to 1 litre with water and 30 grams of agar added. After sterilisation at 100° C., it is introduced in a flat layer in 3 ccs. batches into Petri dishes. To the 3 ccs. of agar contained in each dish there is added 0.2 cc. of active substance solution or dispersion of the contents given in the following Table 2. Infection is carried out by dusting the surface of the agar with spores of green citrus mould (*Penicillium italicum*). After incubation for 8 days at 25° C., the fungus growth given in Table 2 has taken place. In this table, +++ indicates a luxuriant mycelium cover,
++ indicates a loose mycelium cover,
+ indicates only isolated small mycelium islands, and
— indicates no mycelium (total inhibition).

EXAMPLE 4

Oranges are dipped in solutions or dispersions of active substances of the contents given in Table 3. After the coating has dried, they are dusted with spores of green citrus mould and then stored in a moist chamber at 25° C. to intensify the infection conditions. The attack of the fruit after 8 days is given in the table corresponding to the gradations:

++++ =closed mycelium cover,
+++ =loose mycellium cover,
++ =isolated mycelium islands,
(+) =slight traces of mycelium and
— =no mycelium (total inhibition).

Table 2.—Growth of Penicillium italicum

| when using R—N—O—X in which— NO | | Percentage of the active substance in the solution of the active substance | | |
|---|---|---|---|---|
| R= | X= | 0.05 | 0.1 | 0.25 |
| cyclohexyl | ammonium | — | — | — |
| Do | sodium | — | — | — |
| Do | calcium | — | — | — |
| Do | copper | — | — | — |
| cyclo-octyl | ammonium | + | — | — |
| Comparison | | | | |
| phenyl | ammonium | +++ | — | — |
| phenyl | copper | +++ | ++ | ++ |

Control without active substance addition +++.

Table 3.—Growth of Penicillium italicum

| when using R—N—O—X in which— NO | | Percentage content of active substance in the active substance solution | | |
|---|---|---|---|---|
| R= | X= | 0.2 | 1 | 2 |
| cyclohexyl | ammonium | +++ | — | — |
| Do | calcium | +++ | — | — |
| Do | copper | +++ | — | — |
| cyclo-octyl | ammonium | ++ | + | — |
| Comparison | | | | |
| phenyl | ammonium | +++ | ++ | (+)— |
| Do | copper | +++ | + | (+)— |

Control (fruit dipped in water with active substance) +++.

EXAMPLE 5

25% dilutions of polyvinyl pyrrolidone (K-value 30) have added to them fungicidal additions and are then kept for 8 weeks at 25° C. after inoculation with a mixture of mould fungus spores. The fungus growth was as shown in Table 4 corresponding to the gradations:

++ =as without active substance,
+ =isolated colonies,
(+) =1 small colony,
— =total inhibition.

EXAMPLE 6

0.01% by weight of N-nitroso-N-cyclohexyl-hydroxylamine ammonium salt is added to a 20% aqueous solution of a copolymer of equal parts by weight of acrylamide and methacrylamide. After storage for 3 months at room temperature, the sample is still without any fungus attack, whereas an untreated comparative sample becomes mouldy even after a short time.

EXAMPLE 7

A number of samples, each of 80 grams of a liquid vegetable extract mixture with a 23% pure tanning agent content, consisting of 60 parts by weight of chestnut wood extract and 40 parts by weight of fir bark extract, are made up with water to 1 litre (this tanning solution approximately corresponds to one of the average liquors

*Table 4*

| When using— | Fungus growth, mg. of active substance in batch | | | | | | | |
|---|---|---|---|---|---|---|---|---|
| | 1 | 3.3 | 6.7 | 10 | 33 | 67 | 100 | 250 |
| N-nitroso-N-cyclohexyl-hydroxylamine ammonium salt | + | — | — | — | — | — | — | — |
| para-hydroxybenzoic acid methyl ester | ++ | ++ | ++ | ++ | + | (+)— | (+)— | — |

Control without active substance ++.

of a normal dyeing process, which is especially susceptible to mould) and 50 mg. of one of the following N-nitroso-N-cyclohexylhydroxylamine salts added: ammonium salt, cyclohexyl ammonium salt, zinc salt and calcium salt. All samples remain free from mould during an observation period of 3 weeks. A comparative sample without any addition exhibits strong fungus attack even after 5 days.

EXAMPLE 8

Strips of cotton twill are impregnated in two passages at 60° to 70° C. and a squeezing effect of about 90% with intermediate drying, and after drying for 24 hours, soaked for 24 hours in 100 times the bath with change of water five times per hour at 18° C. The strips of material thus treated are then buried in compost earth and exposed to putrefaction for 14 days at 30° C. When removed from the earth, the strips have changed as may be seen from Table 5.

Table 5

| Impregnation | | Degree of destruction |
| --- | --- | --- |
| 1st bath, g. per litre | 2d bath, g. per litre | |
| 10 N-nitroso-N cyclohexyl-hydroxylamine ammonium salt. | 20 copper acetate | slightly discolored in places. |
| Do | do | unchanged. |
| | do | moderately attacked, brittle. |
| | (control) | total destruction. |

We claim:

1. A fungicidal composition comprising as a highly active fungicidal ingredient a compound of a cation selected from the class consisting of hydrogen, ammonium, alkyl-substituted ammonium, sodium, potassium, calcium, barium, aluminum, lead, silver, copper, zinc, mercury, cerium, iron, nickel, and chloromercury, and the anion

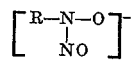

wherein R is a member selected from the class consisting of alkyl, cycloalkyl and aralkyl radicals having from 1 to 8 carbon atoms and the same radicals containing one substituent selected from the class consisting of hydroxymethyl and cyano groups, and an inert carrier for said active ingredient.

2. A fungicidal composition as claimed in claim 1 wherein R is cyclohexyl.

3. A fungicidal composition comprising as a highly active fungicidal ingredient an inorganic salt of the anion

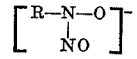

wherein R is a member selected from the class consisting of alkyl, cycloalkyl and aralkyl radicals having from 1 to 8 carbon atoms and the same radicals containing one substituent selected from the class consisting of hydroxymethyl and cyano groups, and an inert carrier for said active ingredient.

4. A fungicidal composition as claimed in claim 3 wherein R is cyclohexyl.

5. A fungicidal composition as claimed in claim 3 wherein the highly active fungicidal ingredient is a copper salt of N-isopropyl-N-nitrosohydroxylamine.

6. A fungicidal composition as claimed in claim 3 wherein the highly active fungicidal ingredient is the cupric salt of N-methyl-N-nitrosohydroxylamine.

References Cited in the file of this patent
UNITED STATES PATENTS 2,635,978    Massengale _____ Apr. 21, 1953